United States Patent
Nishio et al.

(10) Patent No.: US 8,559,963 B2
(45) Date of Patent: Oct. 15, 2013

(54) WIRELESS COMMUNICATION BASE STATION APPARATUS AND REFERENCE SIGNAL ALLOCATION METHOD

(75) Inventors: Akihiko Nishio, Kanagawa (JP); Seigo Nakao, Kanagawa (JP); Katsuhiko Hiramatsu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/994,698

(22) PCT Filed: Jun. 22, 2009

(86) PCT No.: PCT/JP2009/002823
§ 371 (c)(1),
(2), (4) Date: Nov. 24, 2010

(87) PCT Pub. No.: WO2009/157167
PCT Pub. Date: Dec. 30, 2009

(65) Prior Publication Data
US 2011/0070891 A1    Mar. 24, 2011

(30) Foreign Application Priority Data

Jun. 23, 2008   (JP) .................................. 2008-163034

(51) Int. Cl.
*H04W 72/00* (2009.01)
(52) U.S. Cl.
USPC ........ 455/450; 455/451; 455/452.1; 370/329; 370/330; 370/334
(58) Field of Classification Search
USPC ........... 370/203–213, 328–334; 445/447–453
See application file for complete search history.

(56) References Cited

U.S. PATENT DOCUMENTS 8,301,176 B1 * 10/2012 Yellin et al. .................... 455/458
2008/0267057 A1 * 10/2008 Kotecha ......................... 370/203
(Continued)

FOREIGN PATENT DOCUMENTS

EP    2 180 603    4/2010
JP    2010-529757    8/2010
(Continued)

OTHER PUBLICATIONS

International Search Report dated Jul. 14, 2009.
(Continued)

*Primary Examiner* — Dai A Phuong
(74) *Attorney, Agent, or Firm* — Dickinson Wright PLLC (57) ABSTRACT

Disclosed is a wireless communication base station apparatus capable of preventing degradation of throughput of LTE terminals, even when both LTE terminals and LTE+ terminals are present together. In this apparatus, a CCE allocation section (105) allocates the characteristic cell reference signals, which are employed solely by LTE+ terminals, to some CCEs from a plurality of CCEs to which a control channel for LTE terminal use or a control channel for LTE+ terminal use can be allocated. In the case of symbols that are mapped to antennas (113-5) to (113-8), an arrangement section (109) arranges the characteristic cell reference signals that are employed solely by LTE+ terminals in resource elements corresponding to CCEs to which a characteristic cell RS has been allocated that is used solely by an LTE+ terminal, based on position information that is input from an interleaving section (106). Wireless transmission sections (112-1) to (112-8) transmit these symbols, that have been thus input, to each terminal from the antennas (113-5) to (113-8).

8 Claims, 7 Drawing Sheets (56) References Cited

U.S. PATENT DOCUMENTS

| | | | |
|---|---|---|---|
| 2009/0176463 A1* | 7/2009 | Raaf et al. | 455/101 |
| 2009/0186613 A1* | 7/2009 | Ahn et al. | 455/434 |
| 2010/0086070 A1* | 4/2010 | Ishii et al. | 375/260 |
| 2010/0195481 A1* | 8/2010 | Lee et al. | 370/203 |
| 2010/0296473 A1* | 11/2010 | Kim et al. | 370/329 |

FOREIGN PATENT DOCUMENTS

| | | |
|---|---|---|
| WO | 2008/157692 A2 | 12/2008 |
| WO | 2008/157692 A3 | 12/2008 |
| WO | 2009/025081 | 2/2009 |

OTHER PUBLICATIONS

3GPP TSG RAN! 53 meeting, "Technical points for LTE-advanced," ZTE, R1-081773, May 2008, pp. 1-10.

3GPP TSG RAN WG1 Meeting #53, "Proposals for LTE-Advanced Technologies," NTT DoCoMo, R1-081948, May 2008, pp. 1-29.

3GPP TS 36.211 V8.3.0, "Evolved Universal Terrestrial Radio Access (E-UTRA); Physical Channels and Modulation (Release 8)," May 2008, pp. 1-77.

3GPP TSG-RAN 1 Meeting #52, "Performance Evaluation of Dedicated RS Structure for Beam-Forming Transmission," Nortel, R1-080767, Feb. 2008, pp. 1-10.

3GPP TSG RAN WG1 Meeting #51bis, "Reference signal transmission in DwPTS," Samsung, et al., R1-080041, Jan. 2008, pp. 1-3.

3GPP TSG-RAN Working Group 1 #52bis, "Power Scaling and DL RS boosting," Samsung, R1-081231, Mar. 31-Apr. 4, 2008, pp. 1-9.

3GPP TSG RAN WG1 Meeting #52, "RS Configuration in DwPTS," TD Tech, R1-080781, Feb. 2008, pp. 1-2.

3GPP TS 36.213 V8.2.0, "Evolved Universal Terrestrial Radio Access (E-UTRA); Physical layer procedures (Release 8)," Mar. 2008, pp. 1-30.

3GPP TS 36.211 V8.2.0, "Evolved Universal Terrestrial Radio Access (E-UTRA); Physical Channels and Modulation (Release 8)," Mar. 2008, pp. 1-65.

Japanese Office Action dated Jul. 9, 2013.

* cited by examiner

WIRELESS COMMUNICATION BASE STATION APPARATUS AND REFERENCE SIGNAL ALLOCATION METHOD

TECHNICAL FIELD

The present invention relates to a radio communication base station apparatus and a reference signal assigning method.

BACKGROUND ART

3GPP-LTE adopts OFDMA (Orthogonal Frequency Division Multiple Access) as a down link communication method. With 3GPP-LTE, a radio communication base station apparatus (hereinafter "base station") transmits RSs (reference signals) using predetermined communication resources, and radio communication terminal apparatuses (hereinafter "terminals") perform channel estimation using received reference signals to demodulate data (see Non-Patent literature 1.) In addition, terminals use the reference signals to perform adaptive MCS (modulation and channel coding scheme) control, PMI (precoding matrix indicator) control in MIMO (multiple-input multiple-output) transmission, or received quality measurement for adaptive scheduling. Then, terminals feed obtained PMIs and received quality information (CQI: channel quality indicator) back to a base station.

In addition, when a base station has a plurality of antennas, the base station can perform diversity transmission. For example, a base station transmits a plurality of data streams from a plurality of antennas (MIMO transmission) to allow high-speed transmission. In order to receive diversity-transmitted signals as described above with no error, terminals need to know the channel states from a group of antennas used for transmission in a base station, to the terminals. Therefore, RSs need to be transmitted without interfering with each other, from all antennas provided in a base station. To realize this, 3GPP-LTE adopts a method of transmitting RSs from respective antennas in a base station, using timings and carrier frequencies varying in the time domain and the frequency domain.

Figure 1:
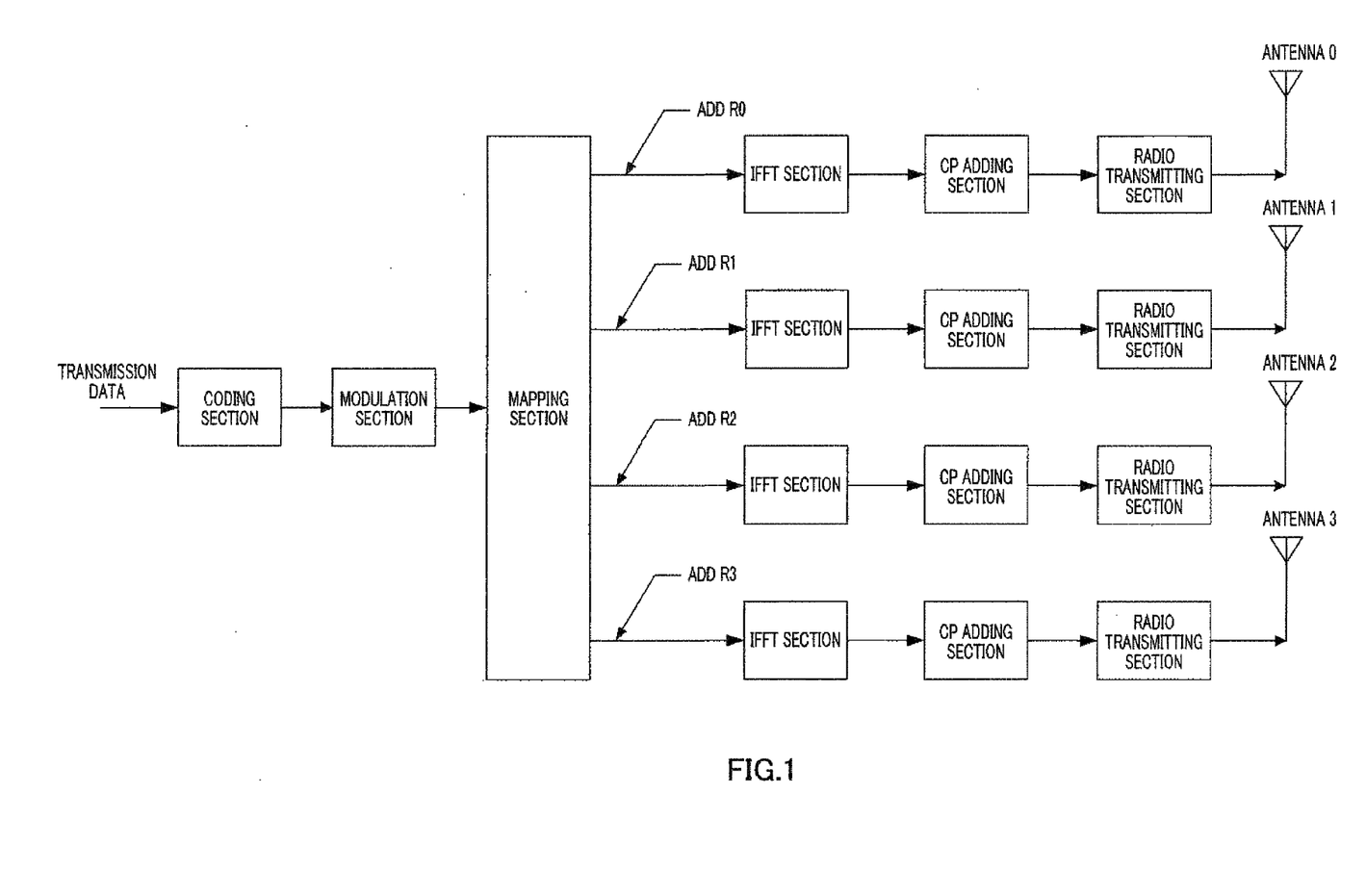
FIG. 1 is a block diagram showing a configuration of a conventional 4Tx base station.
Figure 2:
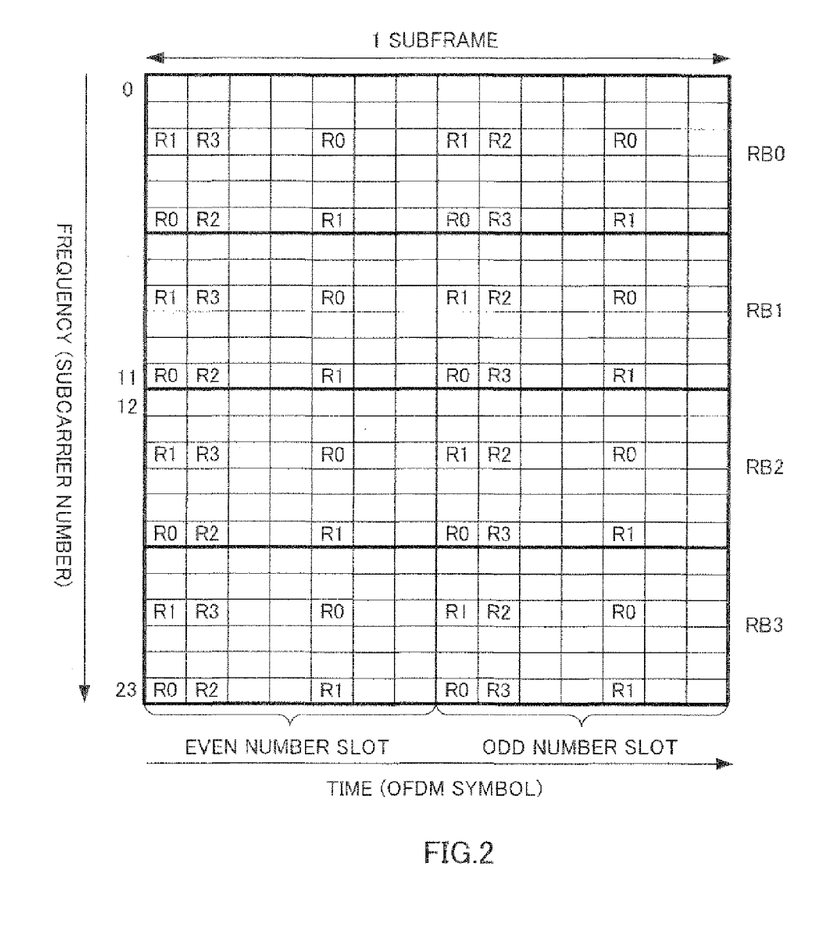
FIG. 2 is a drawing showing an RS transmission method in a conventional 4Tx base station.

FIG. 1 shows a configuration of a base station having four antennas (4Tx base station) anticipated with 3GPP-LTE, and FIG. 2 shows an RS transmission method in a 4Tx base station (see Non-Patent Literature 2.) Here, in FIG. 2, the vertical axis (frequency domain) is indicated by a unit of subcarriers and the horizontal axis (time domain) is indicated by a unit of OFDM symbols. In addition, R0, R1, R2 and R3 indicate RSs transmitted from antennas 0, 1, 2 and 3 (the first, second, third and fourth antennas), respectively. Moreover, in FIG. 2, one block unit enclosed by a bold line frame (six subcarriers in the frequency domain and fourteen OFDM symbols in the time domain) is referred to as a resource block (RB.) Although one RB is composed of twelve subcarriers in 3GPP-LTE, the number of subcarriers constituting one RB is six here for ease of explanation. In addition, each unit of one subcarrier with one OFDM symbol constituting one RB is referred to as a resource element (RE.) As seen from FIG. 2, in order to minimize RS transmission overhead, a 4Tx base station reduces a frequency to transmit RSs (R2 and R3) from antenna 2 (third antenna) and antenna 3 (fourth antenna.)

Here, RSs shown in FIG. 2 are common to all terminals in the cell covered by a base station, and referred to as cell-specific reference signals. In addition, a base station may additionally transmit RSs multiplied by a specific weight on a per terminal basis (UE-specific reference signals) for beamforming transmission.

As described above, with 3GPP-LTE, the maximum number of antennas in a base station is four, and terminals supporting 3GPP-LTE perform data demodulation and downlink signal quality measurement, using RSs (R0 to R3 shown in FIG. 2) transmitted from a base station having maximum four antennas (4Tx base station.)

By contrast with this, LTE-advanced, which is improved 3GPP-LTE, is studying a base station having maximum eight antennas (8Tx base station.) Here, LTE-advanced needs to provide a base station complying with 3GPP-LTE in order to allow communication of terminals supporting only base stations (4Tx base stations) in 3GPP-LTE. In other words, LTE-advanced is required to accommodate both terminals supporting only 4Tx base stations (hereinafter "LTE terminals") and terminals supporting 4Tx base station and also 8Tx base stations (hereinafter "LTE+ terminals" or LTE-advanced-terminals.)

CITATION LIST

Non-Patent Literature
[NPL 1]
3GPP TS 36.213 V8.2.0
(ftp://ftp.3gpp.org/specs/2008-03/Rel-8/36_series/36213-820.zip)
[NPL 2]
3GPP TS 36.211 V8.2.0
(ftp://ftp.3gpp.org/specs/2008-03/Rel-8/36_series/36211-820.zip)

SUMMARY OF INVENTION

Technical Problem

Figure 3:
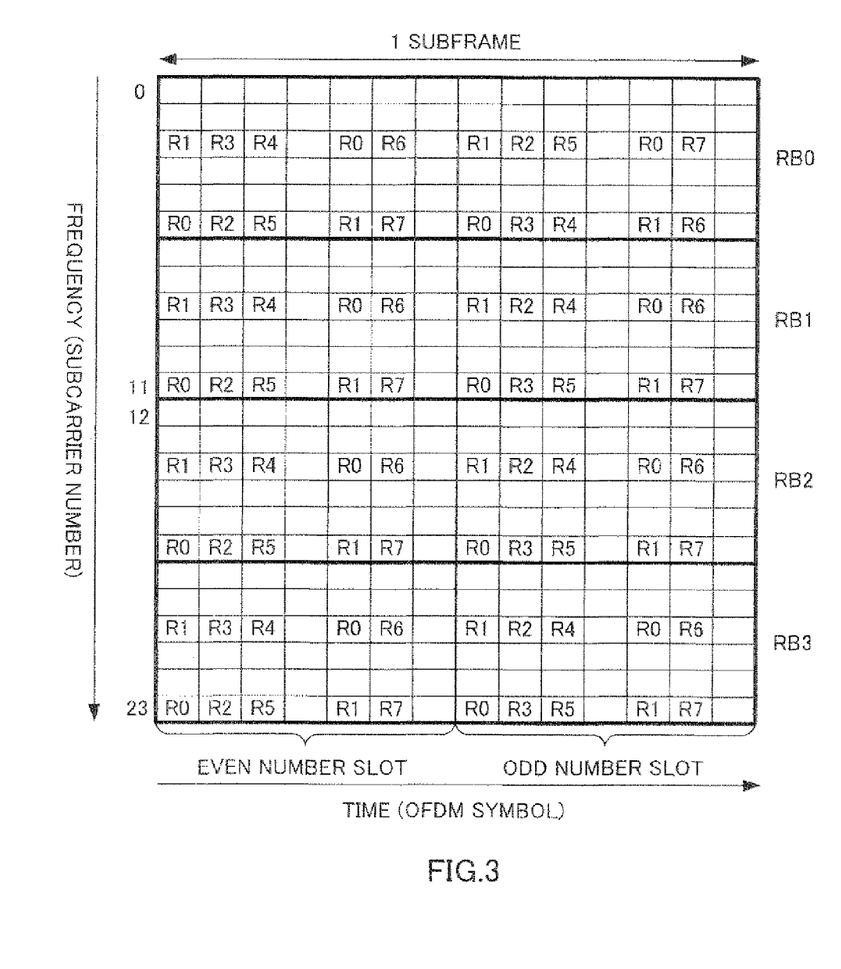
FIG. 3 is a drawing showing an RS transmission method in a conventional 8Tx base station.

With LTE-advanced, a base station needs to transmit RSs for eight antennas in order to allow LTE+ terminals to receive diversity-transmitted signals with no error. For example, as shown in FIG. 3, it may be possible to allocate R0 to R7 corresponding to eight antennas, to all RBs. By this means, LTE+ terminals are able to receive signals with no error. Moreover, terminals can obtain the CQI and PMI for each antenna, on a per subframe basis, so that it is possible to improve throughput by MIMO transmission.

However, LTE terminals only know the positions of allocating RSs (R0 to R3) shown in FIG. 2. That is, LTE terminals do not know the presence of RSs used only in LTE+ terminals, that is, R4 to R7 shown in FIG. 3. Therefore, when RSs (R4 to R7) used only in LTE+ terminals are allocated to REs, LTE terminals recognize the RSs as data signals and receives them. As described above, when LTE terminals and LTE+ terminals exist together, the LTE terminals may not correctly receive signals. This causes error rate performances and throughput of LTE terminals to deteriorate.

It is therefore an object of the present invention to provide a radio communication base station apparatus and a reference signal assigning method to prevent the throughput of LTE terminals from deteriorating even if LTE terminals and LTE+ terminals exist together.

Solution to Problem

The radio communication terminal apparatus according to the present invention is a radio communication terminal station apparatus that transmits a first reference signal used in a first radio communication terminal apparatus supporting a radio communication base station apparatus having N antennas and also used in a second radio communication terminal apparatus supporting a radio communication base station apparatus having more antennas than N antennas, and a second reference signal used only in the second radio communication terminal apparatus. The radio communication base station apparatus adopts a configuration to include: an assigning section that assigns the second reference signal to part of a plurality of control channel elements likely to be assigned control channels for the first radio communication terminal apparatus or control channels for the second communication terminal apparatus; and a transmitting section that transmits the second reference signal assigned to the control channel elements.

The reference signal allocation method according to the present invention includes assigning a second reference signal used only in a second radio communication terminal apparatus supporting a radio communication base station apparatus having more than N antennas, to part of a plurality of control channel elements likely to be assigned control channels for a first radio communication terminal apparatus supporting a radio communication base station apparatus having the N antennas or control channels for the second radio communication terminal apparatus.

Advantageous Effects of Invention

According to the present invention, it is possible to prevent the throughput of LTE terminals from deteriorating even if LTE terminals and LTE-+ terminals exist together.

DESCRIPTION OF EMBODIMENTS

Now, embodiments of the present invention will be described in detail with reference to the accompanying drawings. In the following descriptions, a base station has eight antennas and transmits transmission data to LTE terminals and LTE+ terminals. In addition, one frame is divided into a plurality of subframes. Moreover, a plurality of subcarriers in one subframe are divided into a plurality of RBs. That is, one RB is composed of part of subcarriers in one subframe.

Moreover, in the following descriptions, a base station transmits control information to report results of resource assignment for downlink and uplink data to LTE terminals and LTE+ terminals. This information is transmitted to terminals, using downlink control channels, for example, a PDCCH (physical downlink control channel) and so forth. Here, each PDCCH occupies one or more consecutive CCEs (control channel elements.) In addition, PDCCHs for LTE terminals or PDCCHs for LTE+ terminals can be assigned to a plurality of CCEs. That is, a plurality of CCEs are shared between PDCCHs for LTE terminals and PDCCHs for LTE+ terminals. In addition, one CCE is composed of a plurality of REs. Moreover, a base station generates a PDCCH per terminal (LTE terminal/LTE+ terminal), assigns CCEs by which PDCCHs occupy, according to the number of CCEs required to transmit control information, maps control information to physical resources corresponding to the assigned CCEs, and transmits the result.

Moreover, a base station transmits a plurality of PDCCHs at the same time, in order to assign a plurality of terminals (LTE terminals and LTE+ terminals) to one subframe. At this time, the base station transmits control information including CRC bits scrambled by a destination terminal ID number in order to identify the destination terminal of each PDCCH. Then, a terminal decodes CCEs likely to be assigned PDCCHs, descrambles CRC bits with the terminal ID number of that terminal, and then performs CRC check. As described above, a terminal detects the PDCCH directed to the terminal by performing blind decoding on a plurality of PDCCHs included in received signals.

Figure 4:
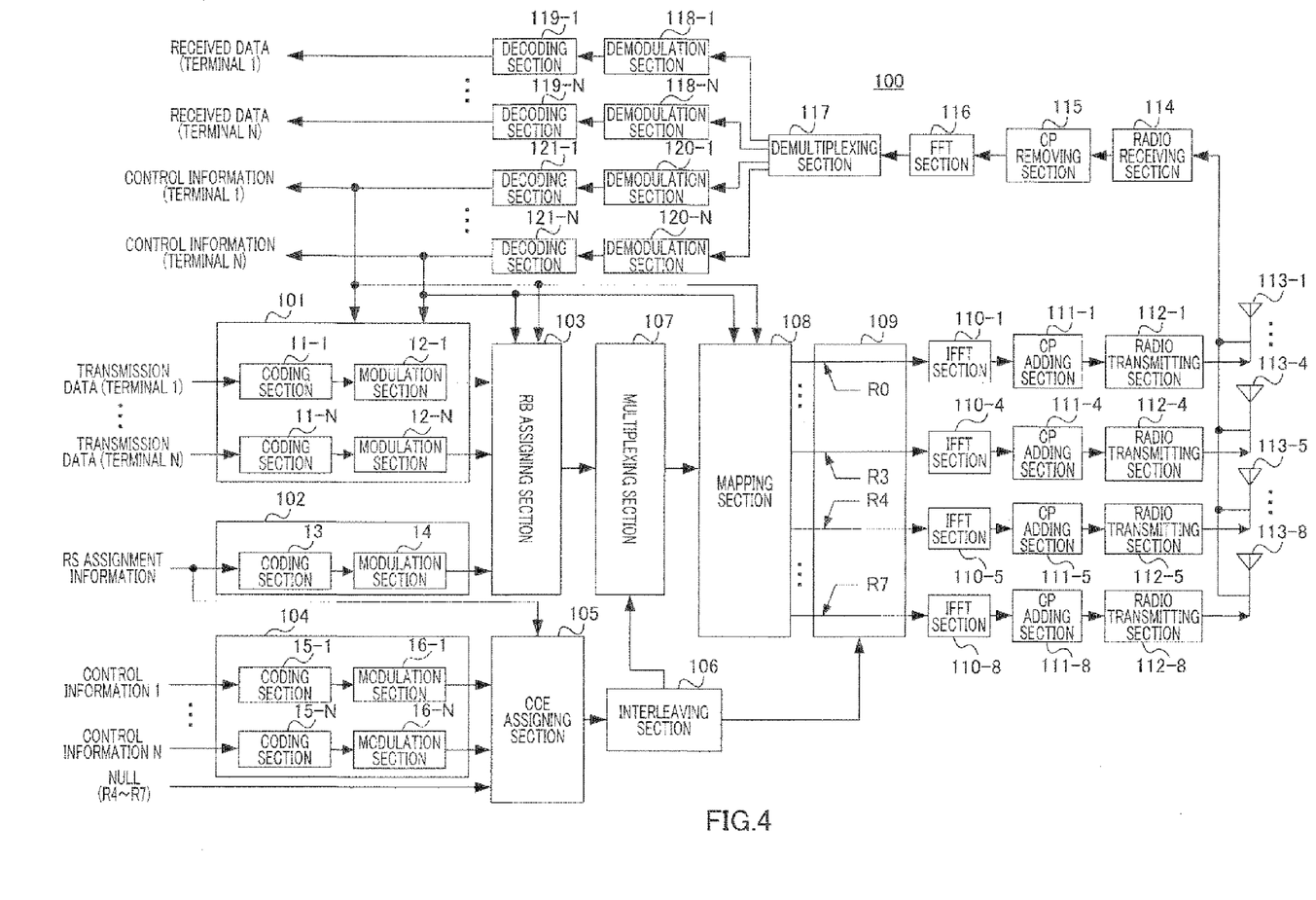
FIG. 4 is a block diagram showing a configuration of a base station according to an embodiment of the present invention;
F1G. 5 is a block diagram showing a configuration of an LTE+ terminal according the embodiment of the present invention.

FIG. 4 shows a configuration of base station 100 according to the present embodiment.

In base station 100, coding and modulation section 101 has N coding sections 11 and N modulation sections 12 for transmission data, where N is the number of terminals that can communicate with base station 100. In coding and modulation section 101, coding sections 11-1 to 11-N perform coding processing on transmission data to terminals 1-N, and modulation sections 12-1 to 12-N perform modulation processing on encoded transmission data to generate data symbols. Here, coding and modulation section 101 determines the coding rate and modulation scheme (i.e. MCSs) in coding section 11 and modulation section 12, respectively, based on CQI information inputted from decoding sections 121-1 to 121-N.

In coding and modulation section 102, coding section 13 performs coding processing on RS assignment information including information that indicates the positions of CCEs to assign cell-specific RSs to, used only in LTE+ terminals, and information that indicates the number of CCEs to assign cell-specific RSs to, used only in LTE+ terminals. Modulation section 14 performs modulation processing on encoded RS assignment information to generate RS assignment information symbols. Here, base station 100 may broadcast RS assignment information to all LTE+ terminals in the cell covered by base station 100, using BCH (broadcast channel) signals. In addition, CCEs to assign cell-specific RSs to, used only in LTE+ terminals, and the number of CCEs to assign cell-specific RSs to, used only in LTE+ terminals may be different per cell.

RB assigning section 103 assigns data symbols and RS assignment information symbols to subcarriers constituting an OFDM symbol, (that is, RBs constituting OFDM symbols), according to CQI information inputted from decoding sections 121-1 to 121-N, and outputs the result to multiplexing section 107.

Coding and modulation section 104 RB has N coding sections 15 and N modulation sections 16 for control information, including RB assignment information indicating RBs to assign data signals of terminals to, MCS information indicating MCSs used in data signals from terminals or HARQ information indicating retransmission from terminals, where N is the number of terminals that can communicate with base station 100. In coding and modulation section 104, coding sections 15-1 to 15-N perform coding processing on control information for terminals 1-N, and modulation sections 16-1 to 16-N perform modulation processing on encoded control information to generate control symbols.

CCE assigning section 105 assigns control symbols inputted from coding and modulation section 104 and cell-specific RSs (R4 to R7) used only in LTE+ terminals, to part of a plurality of CCEs. Here, after symbol sequences are mapped to antennas, respectively, allocation section 109 described later allocates cell-specific RSs (R4 to R7) to the symbol sequences corresponding to the antennas, respectively, so that CCE assigning section 105 assigns null symbols to CCEs to assign cell-specific RSs to (R4 to R7.) Here, CCE assigning section 105 determines the number of CCEs to assign various control information to, based on CQIs fed back from terminals (LTE terminals and LTE+ terminals), and determines CCEs and the number of the CCEs to assign cell-specific RSs to, based on RS assignment information. Then, CCE assigning section 105 outputs symbols assigned to CCEs to interleaving section 106.

Interleaving section 106 interleaves control symbols and null symbols assigned to a plurality of CCEs, on a per RE group (REG) basis, where an REG is composed of a plurality of REs. Then, interleaving section 106 outputs symbols after interleaving to multiplexing section 107. In addition, interleaving section 106 outputs, to allocating section 109, the positions of null symbols after interleaving, that is, position information indicating the positions of REs corresponding to the CCE to assign cell-specific RSs to (R4 to R7) used only in LTE+ terminals.

Multiplexing section 107 time-multiplexes data symbols and RS assignment information symbols inputted from RB assigning section 103 with control symbols and null symbols inputted from interleaving section 106. For example, multiplexing section 107 allocates control symbols and null symbols to three OFDM symbols from the beginning, and allocates data symbols and RS assignment information symbols to OFDM symbols following the third OFDM symbol. Multiplexing section 107 outputs multiplexed symbols to mapping section 108.

Mapping section 108 maps symbols inputted from multiplexing section 107 to antennas 113-1 to 113-8, respectively. Here, mapping section 108 maps control symbols inputted from multiplexing section 107 to antennas 113-1 to 113-4, in order to allow control information to be received by both LTE terminals and LTE+ terminals. Control symbols mapped to antennas 113-1 to 113-4 are transmitted by means of transmission diversity techniques, for example, STBC (space time block coding), SFTD (space frequency block coding based transmit antenna diversity) and CDD (cyclic delay diversity.) In addition, mapping section 108 selects a precoding vector used in each antenna, based on PMI information inputted from decoding sections 121-1 to 121-N. Then, mapping section 108 multiplies symbols mapped to each antenna by the selected precoding vector. Then, mapping section 108 outputs symbols mapped to antennas, respectively, to allocation section 109.

Allocation section 109 adds cell-specific RSs (R0 to R7) to symbols inputted from mapping section 108, which have been mapped to antennas, respectively. To be more specific, allocation section 109 allocates cell-specific RSs (R0 to R3) used in both LTE terminals and LTE+ terminals, to all RBs, in symbols mapped to antennas 113-1 to 113-4. On the other hand, allocation section 109 allocates cell-specific RSs (R4 to R7) used only in LTE+ terminals, to REs corresponding to the CCE to assign cell-specific RSs to, used only in LTE+ terminals, in symbols mapped to antennas 113-5 to 113-8, based on position information inputted from interleaving section 106. To be more specific, allocation section 109 allocates cell-specific RSs (R4 to R7) used only in LTE terminals to REs to which null symbols are assigned. In addition, allocation section 109 allocates terminal-specific RSs to RBs to which transmission data directed to LTE+ terminals are assigned. For example, allocation section 109 uses R4 to R7 as terminal-specific RSs. Here, allocation section 109 may use R4 to R7 multiplied by a terminal-specific weight. Then, allocation section 106 outputs symbol sequences after RS allocation to IFFT sections 110 to 110.

IFFT sections 110 to 110, CP (cyclic prefix) adding sections 111-1 to 111-8 and radio transmitting sections 112-1 to 112-8 are provided corresponding to antennas 113-1 to 113-8, respectively.

IFFT sections 110-1 to 110-8 each perform IFFT on a plurality of subcarriers constituting a plurality of RBs, to which symbols are assigned, to generate an OFDM symbol, which is a multicarrier signal. Then, IFFT sections 110-1 to 110-8 output generated OFDM symbols to CP adding sections 111-1 to 111-8, respectively.

CP adding sections 111-1 to 111-8 each add the same signal as the end part of an OFDM symbol to the beginning of the OFDM symbol as a CP.

Radio transmitting sections 112-1 to 112-8 perform transmission processing, including D/A conversion, amplification, up-conversion and so forth, on OFDM symbols with CPs, and transmit the result to respective terminals via antennas 113-1 to 113-8. By this means, base station 100 transmits a plurality of data streams including cell-specific RSs that are allocated to CCEs and used only in LTE+ terminals, from antennas 113-1 to 113-8.

Meanwhile, radio receiving section 114 receives N signals simultaneously transmitted from maximum N terminals via antennas 113-1 to 113-8, and performs reception processing, including down-conversion, A/D conversion and so forth, on these signals.

CP removing section 115 removes the CPs from signals after reception processing.

FFT (fast Fourier transform) section 116 performs FFT on signals without CPs to obtain a signal multiplexed in the frequency domain for each terminal. Here, a signal for each terminal includes a data signal, and control information containing CQI information and PMI information, for each terminal.

Demultiplexing section 117 demultiplexes a signal from each terminal inputted from FFT section 116 into a data signal and control information for each terminal. Then, demultiplexing section 117 outputs data signals from terminals 1 to N, to demodulation sections 118-1 to 118-N, respectively, and outputs control information from terminals I to N, to demodulation sections 120-1 to 120-N, respectively.

Base station 100 has demodulation sections 118-1 to 118-N, decoding sections 119-1 to 119-N, demodulation sections 120-1 to 120-N and decoding sections 121-1 to 121-N, where N is the number of terminals that can communicate with base station 100.

Demodulation sections 118-1 to 118-N perform demodulation processing on data signals inputted from demultiplexing section 111, and decoding sections 119-1 to 119-N perform decoding processing on data signals after demodulation. By this means, it is possible to obtain received data per terminal.

Demodulation sections 120-1 to 120-N perform demodulation processing on control information inputted from demultiplexing section 117, and decoding sections 121-1 to 121-N perform decoding processing on control information after demodulation. Then, decoding sections 121-1 to 121-N output CQI information and PMI information of control information to coding and modulation section 101, RB assigning section 103 and mapping section 108.

Figure 5:
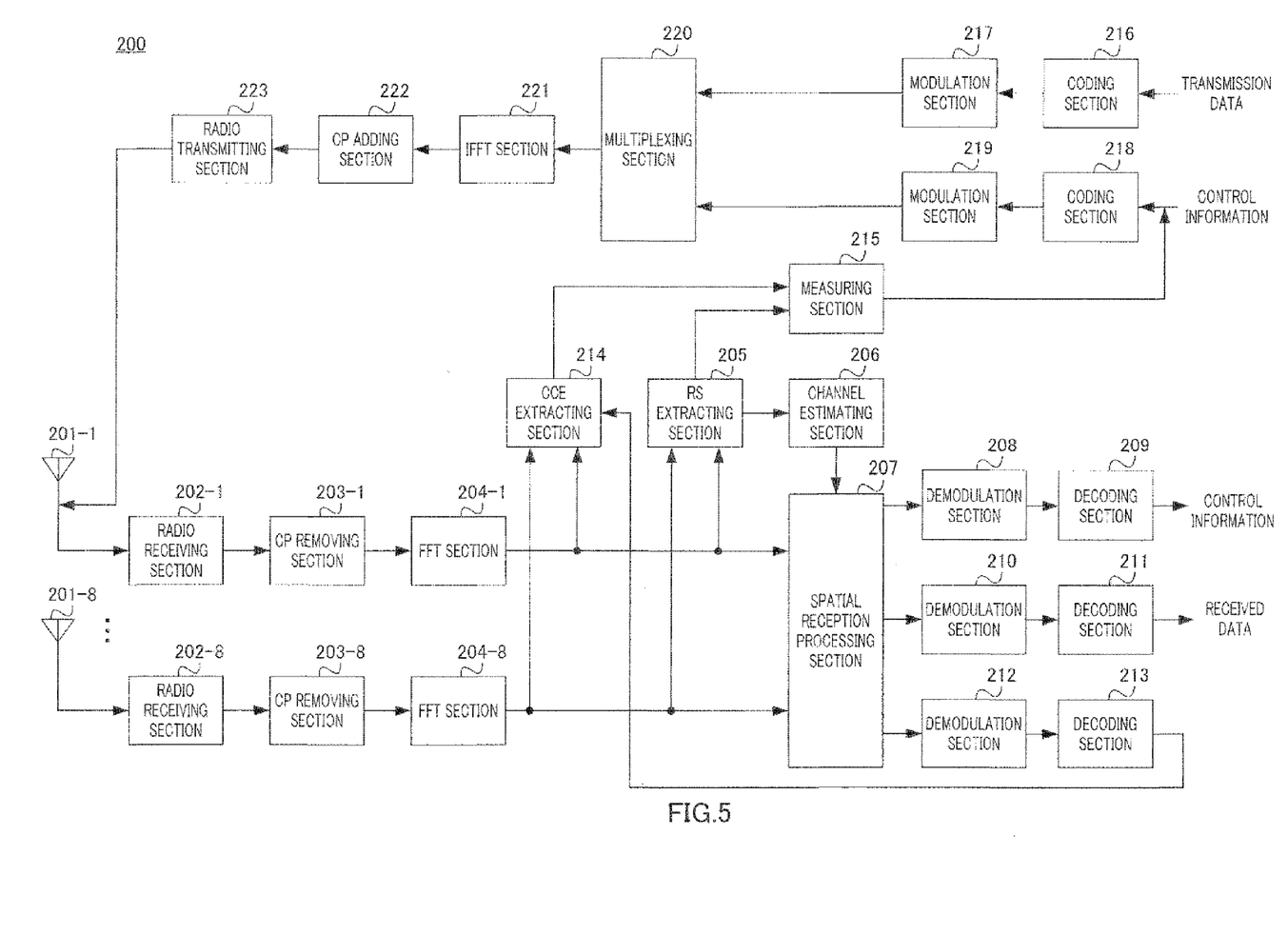

Next, terminal 200 (LTE+ terminal) according to the present embodiment will be explained. FIG. 5 shows the configuration of terminal 200 according to the present embodiment.

In terminal 200 shown in FIG. 5, radio receiving sections 202-1 to 202-8, CP removing sections 203-1 to 203-8 and FFT sections 204-1 to 204-8 are provided corresponding to antennas 201-1 to 201-8, respectively.

Radio receiving sections 202-1 to 202-8 receive OFDM symbols transmitted from base station 100 (FIG. 4) via antennas 201-1 to 201-8, and perform reception processing, including down-conversion, A/D conversion and so forth, on these OFDM symbols.

CP removing sections 203-1 to 203-8 remove the CPs from the OFDM symbols after reception processing.

FFT sections 204-1 to 204-8 perform FFT on OFDM symbols without CPs to obtain frequency domain signals. Then, FFT sections 204-1 to 204-8 output frequency domain signals to RS extracting section 205, spatial reception processing section 207 and CCE extracting section 214, RS extracting sections 205 extracts cell-specific RSs (R0 to R3) and terminal-specific RSs (for example, R4 to R7 multiplied with a terminal-specific weight) from signals inputted from FFT sections 204-1 to 204-8. Then, RS extracting section 205 outputs cell-specific RSs (R0 to R3) to channel estimating section 206 and measuring section 215, and outputs terminal-specific RSs to channel estimating section 206.

Channel estimating section 206 performs channel estimation using cell-specific RSs and terminal-specific RSs inputted from RS extracting section 205, and outputs the channel estimation result to spatial reception processing section 207.

Spatial reception processing section 207 performs spatial demultiplexing processing on signals inputted from FFT sections 204-1 to 204-8, respectively, that is, signals received by antennas 201-1 to 201-8, respectively, using the channel estimation result inputted from channel estimating section 206. Then, spatial reception processing section 207 outputs demultiplexed data streams such that control information is outputted to demodulation section 208, data signals are outputted to demodulation section 210 and RS assignment information is outputted to demodulation section 212.

Demodulation section 208 performs demodulation processing on control information inputted from spatial reception processing section 207, and decoding section 209 performs decoding processing on data signals after demodulation. By this means, it is possible to obtain control information.

Demodulation section 210 performs demodulation processing on data signals inputted from spatial reception processing section 207, and decoding section 211 performs decoding processing on data signals after demodulation. By this means, it is possible to obtain received data.

Demodulation section 212 performs demodulation processing on RS assignment information inputted from spatial reception processing section 207, and decoding section 213 performs decoding processing on RS assignment information after demodulation. Then, decoding section 213 outputs RS assignment information after decoding to CCE extracting section 214.

Meanwhile, CCE extracting section 214 specifies CCEs to allocate cell-specific RSs (R4 to R7), based on RS assignment information inputted from decoding section 213, and extracts cell-specific RSs (R4 to R7) from signals inputted from FFT sections 204-1 to 204-8. Then, CCE extracting section 214 outputs cell-specific RSs (R4 to R7) to measuring section 215. Here, terminals 200 may obtain RS assignment information by receiving BCH signals including the RS assignment information, from base station 100.

Measuring section 215 performs CQI measurement for each of antennas 201-1 to 201-8 and PMI estimation to obtain good reception quality, using cell-specific RSs (R4 to R7) inputted from CCE extracting section 214 and cell-specific RSs (R0 to R3) inputted from RS extracting section 205. Then, measuring section 215 outputs CQ1 information indicating the measured CQI and PMI information indicating the estimated PMI to coding section 218, as control information.

Coding section 216 performs coding processing on transmission data, and modulation section 217 performs modulation processing on encoded transmission data to generate a data symbol. Then, modulation section 217 outputs the generated data symbol to multiplexing section 220.

Coding section 218 performs coding processing on control information containing CQI information and PMI information inputted from measuring section 215, and modulation section 219 performs modulation processing on encoded control information to generate a control information symbol. Then, modulation section 219 outputs the generated control information symbol to multiplexing section 220.

Multiplexing section 220 multiplexes the data symbol inputted from modulation section 217 and the control information symbol inputted from modulation section 219, and outputs a multiplexed signal to IFFT section 221.

IFFT section 221 performs IFFT on a plurality of subcarriers to which the signal inputted from multiplexing section is assigned, and outputs a signal after IFFT to CP adding section 222.

CP adding section 222 adds the same signal as the end part of the signal inputted from IFFT section 221 to the beginning of the signal as a CP.

Radio transmitting section 223 performs transmission processing, including D/A conversion, amplification, up-conversion and so forth, on the signal with a CP, and transmits the result from antenna 201-1 to base station 100 (FIG. 4.)

Next, RS transmission processing in base station 100 (FIG. 4) and RS reception processing in LTE terminals and terminals 200 (LTE+ terminals), according to the present embodiment, will be described in detail.

Figure 6:
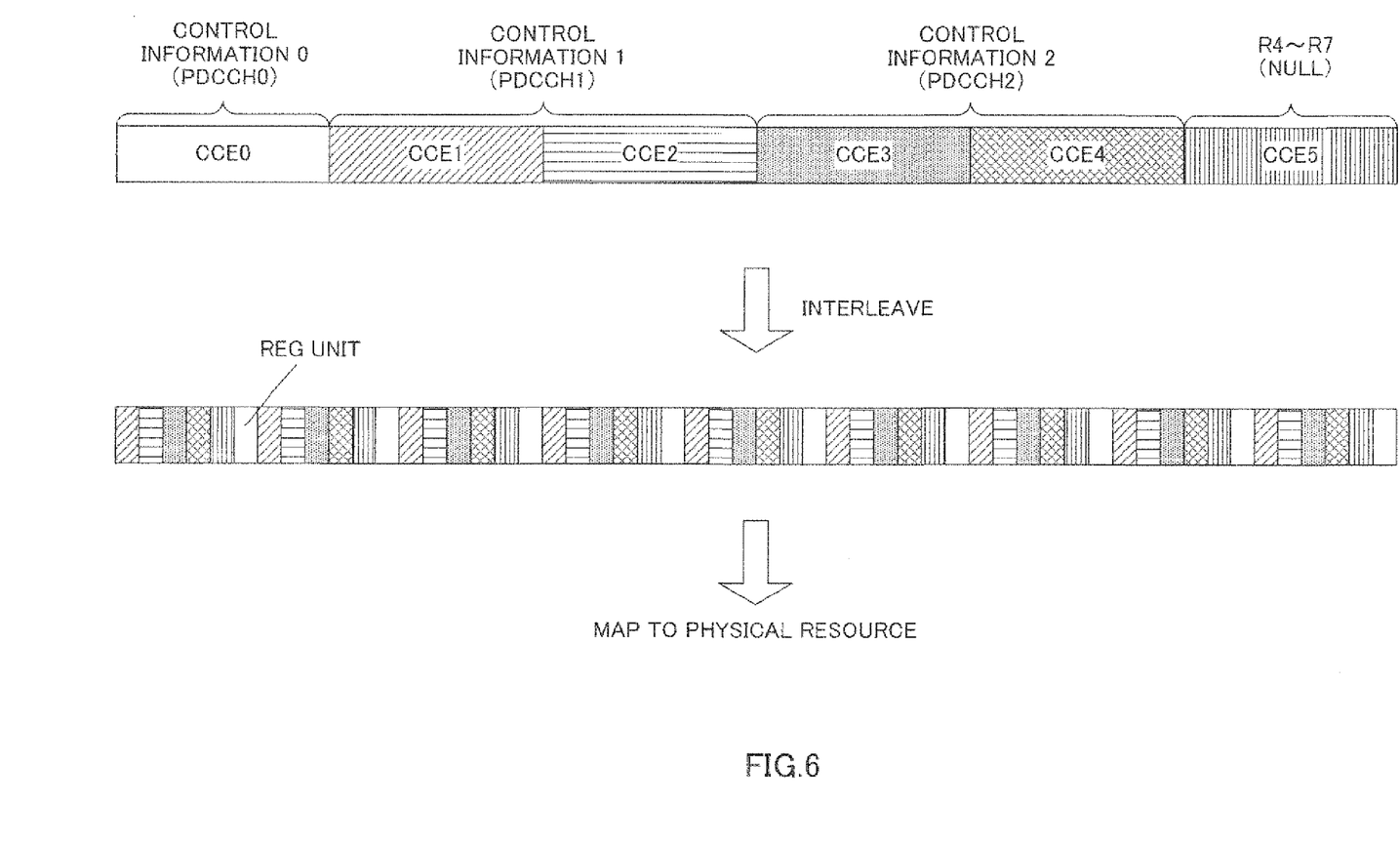
FIG. 6 is a drawing showing interleaving processing according to the embodiment of the present invention.

In the following descriptions, as shown in FIG. 6, the total number of CCEs to assign various control information to, is six, from CCE to CCE 5. In addition, one CCE is composed of thirty-six REs, and one REG is composed of four REs. That is, one CCE is composed of nine REGs.

Figure 7:
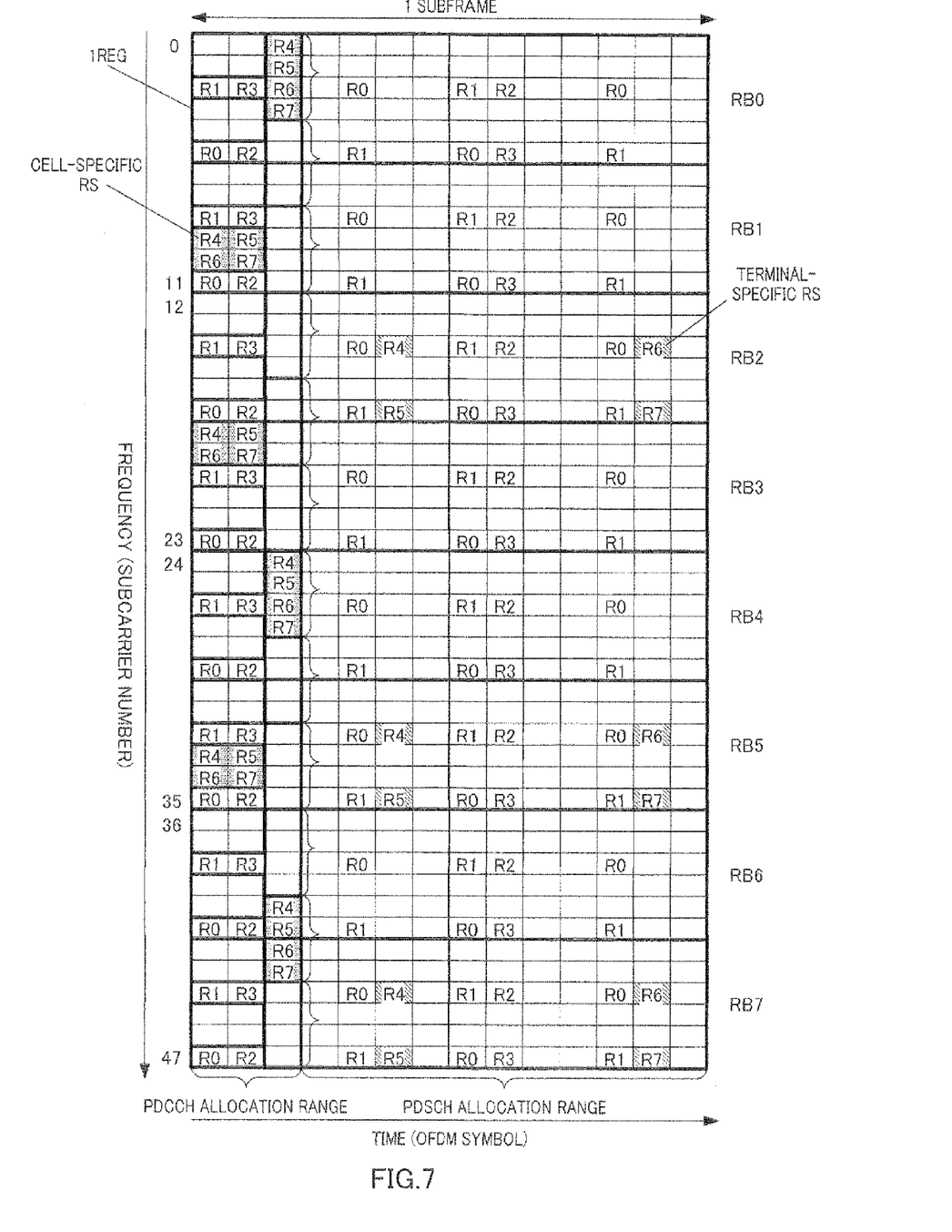
FIG. 7 is a drawing showing RBs to allocate RSs according to the embodiment of the present invention.

In addition, in the following descriptions, among a plurality of RBs formed by evenly dividing a plurality of subcarriers of one subframe every six subcarriers, eight RBs (forty-eight subcarriers) from RB 0 to RB 7 as shown in FIG. 7, will be used as an example. In addition, as shown in FIG. 7, one RB is composed of six subcarriers×one subframe. In addition, as shown in FIG. 7, among a plurality of OFDM symbols, three OFDM symbols from the beginning are a region to allocate PDCCHs to which control information is assigned (PDCCH allocation region.) In addition, OFDM symbols following the third OFDM symbol from the beginning are a region to allocate PDSCHs (physical downlink shared channels) to which data signals are assigned (PDSCH allocation region.) Here, the PDCCH allocation region is composed of REs other than REs to allocate cell-specific RSs (R0 to R3), among three OFDM symbols from the beginning. In addition, the PDCCH allocation region is formed on a per REG basis. To be more specific, in the first OFDM symbol and the second OFDM symbol, four REs composed of two subcarriers×two OFDM symbols constitute one REG. For example, as shown in FIG.

7, four REs composed of two subcarriers of subcarrier numbers 0 and 1×two OFDM symbols constitute one REG, and four REs composed of two subcarriers of subcarrier numbers 3 and 4 constitute one REG. The same applies to subcarriers of subcarrier numbers 6 to 47. In addition, in the third OFDM symbol from the beginning, four REs composed of four subcarriers×one OFDM symbol constitute one REG. For example, as shown in FIG. 7, in the third OFDM symbol from the beginning, four REs composed of subcarriers of subcarrier numbers 0 to 3 constitute one REG, and four REs composed of four subcarriers of subcarrier numbers 4 to 7 constitute one REG. The same applies to subcarriers of subcarrier numbers 8 to 47. In addition, base station 100 assigns LTE+ terminals to RB 2, RB 5 and RB 7. That is, RB assignment information contained in control information indicates RB 2, RB 5 and RB 7 as RBs to assign LTE+ terminals to.

As shown in FIG. 6, CCE assigning section 105 in base station 100 assigns control information 0 (PDCCH 0) to CCE 0, assigns control information 1 (PDCCH 1) to CCE 1 and CCE 2, and assigns control information 2 (PDCCH 2) to CCE 3 and CCE 4. In addition, CCE assigning section 105 assigns cell-specific RSs (R4 to R7) used only in LTE+ terminals, to CCE 5. To be more specific, CCE assigning section 105 assigns null symbols corresponding to cell-specific RSs (R4 to R7) to CCE 5.

Next, interleaving section 106 interleaves CCE 0 to CCE 5 to assign control information 0 to 2 and null symbols per REG to. To be more specific, as shown in FIG. 6, interleaving section 106 distributes nine REGs constituting CCE 0 to CCE 5 in the frequency domain. By this means, one CCE is distributed over all frequency bands.

Mapping section 108 maps symbols assigned to CCEs having been interleaved in interleaving section 106, to REs in the PDCCH allocation region shown in FIG. 7. To be more specific, mapping section 108 sequentially maps symbols assigned to CCEs after interleaving shown in FIG. 6, that is, symbols distributed on a per REG basis in the frequency domain, to the PDCCH allocation region shown in FIG. 7. For example, mapping section 108 maps null symbols corresponding to cell-specific RSs (R4 to R7) to REGs to allocate cell-specific RSs (R4 to R7) shown in FIG. 7, in the PDCCH allocation region. As shown in FIG. 7, null symbols (cell-specific RSs (R4 to R7) shown in FIG. 7) assigned to CCE 5 are mapped to REs distributed over all frequency bands.

Then, allocation section 109 allocates cell-specific RSs (R0 to R3) used in both LTE terminals and LTE+ terminals to preset REs in RB 0 to RB 7, in the PDSCH allocation region, and allocates cell-specific RSs (R4 to R7) used only in LTE+ terminals to REs to which null symbols are mapped, in the PDCCH allocation region. In addition, LTE+ terminals are assigned to RB 2, RB 5 and RB 7, so that allocation section 109 allocates terminal-specific RSs (R4 to R7) to preset REs in RB 2, RB 5 and RB 7, respectively, in the PDSCH allocation region, as shown in FIG. 7.

As described above, base station 100 assigns cell-specific RSs (R4 to R7) used only in LTE+ terminals to part (CCE 5 in FIG. 6) of a plurality of CCEs (CCE 0 to CCE 5 in FIG. 6) likely to be assigned PDCCHs for LTE terminals or PDCCHs for LTE+ terminals. In addition, as shown in FIG. 7, cell-specific RSs (R4 to R7) are distributed and allocated over all frequency bands. Moreover, as shown in FIG. 7, cell-specific RSs (R 0 to R 3) used in both LTE terminals and LTE+ terminals are allocated to all RBs.

By this means, terminal 200 (LTE+ terminal) can perform CQI measurement and PMI estimation, using cell-specific RSs (R0 to R3) allocated to all RBs in the PDSCH allocation region and cell-specific RSs (R4 to R7) allocated in the PDCCH allocation region and distributed and allocated over all frequency bands. In additions, LTE terminals can perform CQI measurement and PMI estimation, using cell-specific RSs (R0 to R3) allocated to all RBs in the PDSCH allocation region. Then, terminals 200 (LTE+ terminals) and LTE terminals each feed the obtained CQI and PMI to base station 100. In addition, base station 100 performs adaptive MCS control based on the fed back CQI and transmits transmission data by MIMO, using the fed back PMI. By this means, base station 100 can perform adaptive MCS control and MIMO transmission using sufficiently accurate CQIs and PMIS from terminals 200 (LTE+ terminals) and LTE terminals. By this means, even if terminals 200 (LTE+ terminals) and LTE terminals exist together, it is possible to prevent throughput of terminals 200 (LTE+ terminals) and LTE terminals from deteriorating. Here, CCEs exist only in the beginning of subframes and are distributed over all frequency bands as shown in FIG. 7, so that R4 to R 7 assigned to CCEs are allocated at longer time and frequency intervals than those of R0 to R3 allocated in all RBs. However, LTE+ terminals use R4 to R7 assigned to CCEs only for CQI measurement and PMI estimation, and use terminal-specific RSs for data demodulation, so that it is possible to prevent deterioration of accuracy of CQI measurement and PMI estimation and also prevent deterioration of data demodulation performance.

Here, base station 100 assigns specific RSs (R4 to R7) used only in LTE+ terminals to CCEs and transmits them, so that the number of CCEs that can be assigned to control information (PDCCH) is reduced. However, LTE+ terminals performing high-speed transmission using eight antennas need to perform highly accurate spatial channel demultiplexing processing, and therefore are anticipated to be located in an environment with good reception quality (for example, in a microcell of a small cell radius.) In addition, a high MCS level is set for terminals with good reception quality, so that it is possible to satisfy required reception quality. Therefore, even if base station 100 assigns cell-specific RSs used only in LTE+ terminals to fewer CCEs (e.g. one CCE) and transmits them, it is possible to satisfy the required reception quality for LTE+ terminals. Therefore, the number of CCEs assigned to control information (PDCCH) directed to LTE+ terminals with good reception quality is reduced. That is, a decrease in the number of CCEs that can be assigned to control information (PDCCH) due to assignment of cell-specific RSs to, used only in LTE+ terminals to CCEs, does not influence the communication system much.

In addition, as shown in FIG. 7, in the PDSCH allocation region, cell-specific RSs (R4 to R7) are not allocated, but only cell-specific RSs (R0 to R3) used in both LTE terminals and LTE+ terminals are allocated. That is, allocation of cell-specific RSs in each RB in the PDSCH allocation region is the same as in 3GPP-LTE (FIG. 2.) Accordingly, restrictions on scheduling of RBs to assign LTE terminals to, are removed, so that base station 100 is able to assign LTE terminals to all RBs.

Moreover, when data of terminal 200 (LTE+ terminal) is allocated to RBs, base station 100 allocates terminal-specific RSs for data demodulation (for example, R4 to R7 multiplied by a terminal-specific weight) to RBs to assign data to, and transmits them. That is, base station 100 can assign data signals directed to LTE+ terminals to all RBs by using terminal-specific RSs. Therefore, in the PDSCH allocation region, there is no restriction on scheduling of RBs to assign LTE+ terminals to, like LTE terminals, so that base station 100 is able to assign LTE+ terminals to all RBs. Consequently, it is possible to improve frequency scheduling effect of both LTE terminals and LTE+ terminals.

Here, RBs used to transmit terminal-specific RSs vary depending on that which RBs are assigned to LTE+ terminals by base station 100, and each LTE+ terminal is reported only the RB assigned to that LTE+ terminal from base station 100. Therefore, each LTE+ terminal only knows the presence of the terminal-specific RSs in the RB assigned to that LTE+ terminal. That is, other LTE+ terminals cannot perform CQI measurement and PMI estimation using terminal-specific RSs. However, with the present embodiment, cell-specific RSs assigned to CCEs in the PDCCH allocation region are transmitted, so that other LTE+ terminals can perform. CQI measurement and PMI estimation even if they do not know terminal-specific RSs.

Meanwhile, upon receiving a signal from base station 100, an LTE terminal performs channel estimation using cell-specific RSs (R0 to R3) shown in FIG. 7. Then, the LTE terminal performs spatial reception processing using the channel estimation result to obtain a symbol sequence allocated in the PDCCH region. Then, the LTE terminal deinterleaves the symbol sequence using the same interleaving pattern as in interleaving section 106 in base station 100 to form CCEs shown in FIG. 6. In addition, the LTE terminal performs decoding processing on control information formed by either one or more CCEs.

Then, the LTE terminal blind-decodes a plurality of pieces of control information included in the received signal to detect the control information directed to that LTE terminal, Here, the LTE terminal discards control information that is determined as control information not directed to that LTE terminal. That is, the LTE terminal discards cell-specific RSs (R4 to R7) assigned to CCE 5 shown in FIG. 6, which are used only in LTE+ terminals. Therefore, when base station 100 assigns cell-specific RSs (R4 to R7) to CCEs, even if LTE terminals do not know the presence of CCEs to assign cell-specific RSs to, used only in LTE+ terminals, they do not receive cell-specific RSs (R4 to R7) as control information directed to them by mistake, so that it is possible to prevent deterioration of error rate performances.

In addition, like an LTE terminal, terminal 200 (LTE+ terminal) performs blind decision to obtain control information assigned to CCEs that is directed to terminal 200. Here, terminal 200 (LTE+ terminal) specifies REs to allocate CCE 5 shown in FIG. 6, based on RS assignment information transmitted from base station 100, and extracts cell-specific RSs (R4 to R7) from the specified REs. Then, terminal 200 (LTE+ terminal) perform CQI measurement and PMI estimation using extracted cell-specific RSs (R4 to R7) and cell-specific RSs (R0 to R3) allocated to all RBs.

As described above, according to the present embodiment, cell-specific RSs used only in LTE+ terminals are assigned to part of a plurality of CCEs likely to be assigned PDCCHs for LTE terminals or PDCCHs for LTE+ terminals. By this means, only cell-specific RSs used in both LTE terminals and LTE+ terminals are allocated to all RBs to assign data signals to, so that a base station can assign data signals directed to LTE terminals to all RBs. In addition, LTE terminals do not detect cell-specific RSs assigned to CCEs and used only in LTE+ terminals, as control information directed to these LTE terminals, and discard the cell-specific RSs. Therefore, LTE terminals do not receive cell-specific RSs used only in LTE+ terminals, as control information directed to these LTE terminals, so that it is possible to prevent deterioration of error rate performances. Therefore, with the present embodiment, even if LTE terminals and LTE+terminals exist together, it is possible to prevent the throughput of LTE terminals from deteriorating.

In addition, with the present embodiment, in order to assign data signals directed to LTE+ terminals to, a base station allocate terminal-specific RSs to RBs. By this means, a base station can allocate data signals directed to LTE+ terminals to all RBs, so that it is possible to improve frequency scheduling effect.

Moreover, with the present embodiment, cell-specific RSs used in both LTE terminals and LTE+ terminals are allocated to all RBs, and cell-specific RSs used only in LTE+ terminals are allocated to REs corresponding to CCEs distributed and allocated over all frequency bands. By this means, LTE terminals and LTE+ terminals can accurately perform CQI measurement and PMI estimation over all frequency bands.

Here, with the present embodiment, a case has been described where a base station assigns cell-specific RSs used only in LTE+ terminals to CCEs. However, according to the present invention, resources to which a base station assigns cell-specific RSs used only in LTE+ terminals, are not limited to CCEs, and, control channel resources used by both control channels for LTE terminals and control channels for LTE+ terminals may be possible. For example, a base station may assign cell-specific RSs used only in LTE+ terminals to resources for PHICHs (physical hybrid-ARQ indicator channelsor "ACK/NACK channels").

In addition, according to the present invention, a base station may assign cell-specific RSs used only in LTE+ terminals to a plurality of CCEs (for example, CCE 0 to CCE 5 shown in FIG. 6.) differing per subframe. By this means, REs to allocate cell-specific RSs used only in LTE+ terminals change per subframe, so that it is possible to uniform allocation density of cell-specific RSs in the frequency domain over all freqency bands.

Moreover, with the present embodiment, a case has been described where a base station assigns null symbols instead of cell-specific RSs used only in LTE+ terminals, to CCEs, interleaves these CCEs to which null symbols have been assigned, maps the result to physical resources, and then allocates cell-specific RSs to REs corresponding to the CCEs. However, according to the present invention, a base station may directly assign cell-specific RSs used only in LTE+ terminals to CCEs, interleave these CCEs to which cell-specific RSs have been assigned, and map the result to physical resources. In this case, it is possible to produce the same effect as with the present embodiment.

In addition, according to the present invention, a base station may change the number of CCEs to assign cell-specific RSs to, used only in LTE+ terminals, according to the number of LTE terminals, or the ratio between the number of LTE terminals and LTE+ terminals, in the communication range (i.e. cell) of the base station. For example, when the number of LTE terminals is greater than that of LTE+ terminals, more CCEs need to be used to transmit PDCCHs, so that a base station reduces the number of CCEs to assign cell-specific RSs to, used only in LTE+ terminals. On the other hand, when the number of LTE terminals is equal to or less than that of LTE+ terminals, a base station increases the number of CCEs to assign cell-specific RSs to, used only in LTE+ terminals. Alternately, when the number of LTE terminals existing in the communication range of a base station is smaller, the base station may increase the number of CCEs to assign cell-specific RSs to, used only in LTE+ terminals. In addition, when the number of LTE+ terminals existing in the communication range of a base station is smaller, the base station may reduce the number of CCEs to assign cell-specific RSs to, used only in LTE+ terminals, and, moreover, when there is no LTE+ terminal performing transmission with eight antennas, the base station reduces the number of CCEs to assign cell-specific RSs to, used only in LTE+ terminals, to zero. As describe above, a base station controls the number of CCEs to assign cell-specific RSs to, used only in LTE+ terminals, according to the number of LTE terminals and the number of LTE+ terminals. By this means, even if a base station assigns cell-specific RSs used only in LTE+ terminals to CCEs, CCEs used for PDCCHs to which control information is assigned, is not short, and, if there are remaining CCEs, CCEs to assign cell-specific RSs to, used only in LTE+ terminals are maximally reserved so that it is possible to improve accuracy of CQI measurement and PMI estimation.

In addition, one CCE is composed of the same number of REs (e.g. thirty-six REs) regardless of a system bandwidth, and distributed and allocated over all frequency bands. Therefore, when a system bandwidth is longer, REGs constituting one CCE are allocated at wider frequency intervals. Therefore, according to the present invention, a base station may increase the number of CCEs to assign cell-specific RSs to, used only in LTE+ terminals when a system bandwidth is wider. By this means, cell-specific RSs are allocated at reasonable narrow frequency intervals regardless of a system bandwidth, so that it is possible to provide accurate CQI measurement and PMI estimation in LTE+ terminals.

Moreover, according to the present invention, when changing the number of CCEs to assign cell-specific RSs to, used in only LTE+ terminals, depending on, for example, a cell environment, a base station may broadcast information indicating that the number of CCEs to assign cell-specific RSs to, used only in LTE+ terminals has been changed, to all LTE+ terminals, using BCH signals. Here, associations between the number of CCEs to assign cell-specific RSs to, used only in LTE+ terminals and the positions of REs corresponding to those CCEs are shared between a base station and LTE+ terminals. By this means, a base station can change the number of CCEs depending on a cell environment without reporting the positions of REs to allocate cell-specific RSs to LTE+ terminals every time the number of CCEs to assign cell-specific RSs to, used only in LTE+ terminals is changed. In addition, a base station may report information indicating that the number of CCEs to assign cell-specific RSs to, used only in LTE+ terminals has been changed, to LTE+ terminals individually, using RRC (radio resource control) signaling.

Moreover, with the above-described embodiment, a communication system in which LTE terminals and LTE+ terminals exist together, has been explained. However, the present invention is not limited to a communication system in which LTE terminals and LTE+ terminals exist together, but is applicable to, for example, a communication system in which terminals supporting only a base station having N antennas and terminals supporting a base station having N antennas and also a base station having more antennas than N antennas exist together. Moreover, the present invention is applicable to a case in which terminal 1 and terminal 2 exist together, where terminal 1 operates in communication system A and terminal 2 operates in only communication system B of an earlier version than communication system A in which terminal 1 operates.

Moreover, with the above-described embodiment, a case has been explained where a plurality of subcarriers in one subframe is divided into eight RBs. However, according to the present invention, the number of RBs into which a plurality of subcarriers in one subframe is divided, is not limited to eight.

A terminal may also be referred to as "UE," a base station apparatus may also be referred to as a "Node B" and a subcarrier may also be referred to as a "tone." Moreover, a CP may also be referred to as a "guard interval (GI.)"

Furthermore, a cell-specific RS may also be referred to as "common RS." Furthermore, a reference signal may also be referred to as "pilot signal." Furthermore, a subframe may also be referred to as "slot."

Furthermore, an antenna may also be referred to as "antenna port." Here, a plurality of physical antennas may be used as one antenna port. "Antenna port" refers to a theoretical antenna formed by one or more physical antennas. That is, "antenna port" does not necessarily refer to one physical antenna, but may refer to an array antenna and so forth composed of a plurality of antennas. For example, 3GPP-LTE does not define how many physical antennas constitute an antenna port but defines an antenna port as a minimum unit to allow a base station to transmit different reference signals. In addition, an antenna port may be defined as a minimum unit for multiplying a precoding vector as weighting. For example, in a base station having eight physical antennas (physical antennas 0 to 7), physical antennas 0 and 4 transmit R0 with weighting (e.g. weighting factor (1, 1)) and transmit R4 with weighting orthogonal to the weighting of R0 (e.g. weighting factor (1, −1)). Likewise, physical antennas 1 and 5 transmit R1 with weighting (e.g. weighting factor (1, 1)) and transmit R5 with weighting orthogonal to the weighting of R1 (e.g. weighting factor (1, −1)). In addition, physical antennas 2 and 6 transmit R2 with weighting (e.g. weighting factor (1, 1)) and transmit R6 with weighting orthogonal to the weighting of R2 (e.g. weighting factor (1, −1)). Moreover, physical antennas 3 and 7 transmit R3 with weighting (e.g. weighting factor (1, 1)) and transmit R7 with weighting orthogonal to the weighting of R3 (e.g. weighting factor (1, −1)). By this means, LTE+ terminals can perform channel estimation by demultiplexing respective channels from physical antennas 0 and 4 to these LTE+ terminals using R0 and R4. Likewise, LTE+ terminals can perform channel estimation by demultiplexing respective channels from physical antennas 1 and 5 to these LTE+ terminals using R1 and R5, perform channel estimation by demultiplexing respective channels from physical antennas 2 and 6 to these LTE+ terminals using R2 and R6 and perform channel estimation by demultiplexing respective channels from physical antennas 3 and 7 to these LTE+ terminals using R3 and R7. That is, a base station transmits two cell-specific RSs with weighting orthogonal to one another, from two physical antennas. Even if this RS transmission method is employed, the present invention can provide the same advantage as in the above-described embodiments.

In addition, with the above-described embodiments, although the cases have been described where LTE+ terminals employ high-order MIMO (MIMO with eight antennas), the present invention is not limited to this but is applicable to a case in which the receiving side (LTE+ terminals) receives reference signals for more antennas than in 3GPP-LTE, for example, receives reference signals from a plurality of base stations. For example, although one base station has eight antennas in the above-described embodiment, the present invention is applicable to a case in which a plurality of base stations have eight antennas. In addition, with the above-described embodiments, assume that 3GPP-LTE uses four antennas, a case has been described as an example where high-order MIMO uses eight antennas by adding four antennas with respect to the case of 3GPP-LTE. However, the present invention is not limited to this, and assume that 3GPP-LTE uses two antennas, high-order MIMO may use a total of four antennas by adding two antennas with respect to the case of 3GPP-LTE. Otherwise, the above-described numbers of antennas may be combined, and assume that 3GPP-LTE uses two antennas or four antennas, high-order MIMO may use the number of antennas by adding two antennas or four antennas with respect to the case of 3GPP-LTE. Otherwise, assume that 3GPP-LTE uses two antennas, high-order MIMO may use a total of eight antennas by adding six antennas with respect to the case of 3GPP-LTE.

In addition, when the concept of antenna port is employed, even if the number of actual physical antennas is eight, four antenna ports may be defined for cell-specific RSs supporting 3GPP-LTE (cell-specific RSs used in both LTE terminals and LTE+ terminals) and other eight antenna ports may be defined for cell-specific RSs supporting high-order MIMO (cell-specific RSs used only in LTE+ terminals). In this case, a base station can operate such that it transmits cell-specific RSs supporting 3GPP-LTE with weighting by two physical antennas per antenna port and transmits cell-specific RSs supporting high-order MIMO without weighting, from each antenna.

In addition, cell-specific RSs may be defined as RSs used to demodulate broadcast information (PBCH) or PDCCH in its cell, and terminal specific RSs may be defined as RSs used to demodulate transmission data to terminals.

In addition, methods of transforming between the frequency domain and the time domain are not limited to IFFT and RFT.

Moreover, the present invention is applicable to not only base stations and terminals, but also all radio communication apparatuses.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No 2008-163034, filed on Jun. 23, 2008, including the specification, drawings and abstract, is incorporated herein by reference in its entirety.

INDUSTRIAL APPLICABILITY

The present invention is applicable to a mobile communication system and so forth.

The invention claimed is:

1. A radio communication base station apparatus, comprising:
   a mapping section configured to map a first reference signal used in a first terminal via a first communication system and a second terminal via a second communication system to all resource blocks, each of which is comprised of consecutive subcarriers, and to map a second reference signal used in the second terminal to one or more of control channel elements (CCEs), wherein a control channel of the first terminal and a control channel of the second terminal are assigned to the others of the CCEs; and
   a transmitting section configured to transmit the mapped first reference signal and the mapped second reference signal,
   wherein the first communication system is a LTE, and the second communication system is a LTE-Advanced.

2. The radio communication base station apparatus according to claim 1, wherein the first communication system is an older version of a technology standard than the second communication system.

3. The radio communication base station apparatus according to claim 1, wherein said transmitting section is configured to transmit information indicating one or more of the CCEs, to which the second reference signal is mapped.

4. The radio communication base station apparatus according to claim 1, wherein the mapping section is configured to map the second reference signal to a plurality of the CCEs, the plurality of the CCEs are different per subframe.

5. The radio communication base station apparatus according to claim 1, wherein the mapping section is configured to reduce a number of CCEs to which the second reference signal is mapped according to a number of second terminals existing in a cell.

6. The radio communication base station apparatus according to claim 1, wherein the mapping section is configured to increase a number of CCEs to which the second reference signal is mapped according to a number of first terminals existing in a cell.

7. The radio communication base station apparatus according to claim 1, wherein the mapping section is configured to increase a number of CCEs to which the second reference signal is mapped according to an available bandwidth of a corresponding system.

8. A reference signal mapping method, the method comprising:
   mapping a first reference signal used in a first terminal via a first communication system and a second terminal via a second communication system to all resource blocks, each of which is comprised of consecutive subcarriers;
   mapping a second reference signal used in the second terminal to one or more control channel elements (CCEs); and
   assigning a control channel of the first terminal and a control channel of the second terminal to the others of the CCEs,
   wherein the first communication system is a LTE, and the second communication system is a LTE-Advanced.

* * * * *